(12) United States Patent
Shen et al.

(10) Patent No.: US 9,112,697 B2
(45) Date of Patent: *Aug. 18, 2015

(54) SYSTEMS AND METHODS OF TRANSMITTER PROTECTION FOR WIRELESS COMMUNICATIONS

(71) Applicant: Aviat U.S., Inc., Santa Clara, CA (US)

(72) Inventors: Ying Shen, Chapel Hill, NC (US); David Schafer, Indian Harbour Beach, FL (US)

(73) Assignee: Aviat U.S., Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/606,940

(22) Filed: Jan. 27, 2015

(65) Prior Publication Data

US 2015/0140941 A1     May 21, 2015

Related U.S. Application Data

(63) Continuation of application No. 14/016,992, filed on Sep. 3, 2013, now Pat. No. 8,983,405, which is a continuation of application No. 13/249,186, filed on Sep. 29, 2011, now Pat. No. 8,526,895.

(60) Provisional application No. 61/387,932, filed on Sep. 29, 2010.

(51) Int. Cl.
| | |
|---|---|
| *H04B 1/02* | (2006.01) |
| *H04L 1/22* | (2006.01) |
| *H04B 1/74* | (2006.01) |
| *H04B 7/06* | (2006.01) |
| *H04W 56/00* | (2009.01) |

(52) U.S. Cl.
CPC .. *H04L 1/22* (2013.01); *H04B 1/74* (2013.01); *H04B 7/0617* (2013.01); *H04B 7/0697* (2013.01); *H04W 56/003* (2013.01)

(58) Field of Classification Search
CPC ....... H04B 1/74; H04B 7/0617; H04B 7/0697
USPC .......... 455/39, 502, 67.16, 91, 101, 102, 103, 455/108; 375/295, 300
See application file for complete search history.

(56) References Cited

U.S. PATENT DOCUMENTS

| | | | | |
|---|---|---|---|---|
| 5,875,215 | A  * | 2/1999 | Dobrica ........................ | 375/344 |
| 8,526,895 | B2 * | 9/2013 | Shen et al. .................... | 455/101 |
| 8,712,356 | B2 * | 4/2014 | Montalvo et al. ............. | 455/205 |

(Continued)

OTHER PUBLICATIONS

International Application No. PCT/US2011/054030, International Search Report and Written Opinion mailed Jan. 20, 2012.

*Primary Examiner* — Tuan Pham

(74) *Attorney, Agent, or Firm* — Sheppard, Mullin, Richter & Hampton LLP

(57) ABSTRACT

Various embodiments provide for systems and methods for wireless communications that implement transmitter protection schemes using spatial combining. The protection scheme implemented by some embodiments provides for a number of benefits, including without limitation: hitless protection; constant power monitoring for each wireless channel being utilized; extra gain to wireless signals transmitted; beam steering, beam hopping, and beam alignment capabilities; and varying levels of transmission path protection (e.g., 1+1 protection, or 1+N protection). Additionally, the features of some embodiments may be applied to a variety of wireless communications systems including, for example, microwave wireless systems, cellular phone systems and WiFi systems.

20 Claims, 7 Drawing Sheets

(56) References Cited

U.S. PATENT DOCUMENTS

| | | |
|---|---|---|
| 8,983,405 B2 * | 3/2015 | Shen et al. .................... 455/101 |
| 2003/0222658 A1 * | 12/2003 | Schajer ........................ 324/639 |
| 2004/0204100 A1 | 10/2004 | Braithwaite |
| 2006/0291583 A1 | 12/2006 | Hammerschmidt et al. |
| 2008/0153433 A1 * | 6/2008 | Pallonen et al. ............. 455/90.2 |
| 2009/0135717 A1 | 5/2009 | Kamal et al. |
| 2009/0191825 A1 | 7/2009 | Georgantas et al. |

* cited by examiner

US 9,112,697 B2

SYSTEMS AND METHODS OF TRANSMITTER PROTECTION FOR WIRELESS COMMUNICATIONS

CROSS-REFERENCE TO RELATED APPLICATIONS

This application is a continuation of U.S. Nonprovisional application Ser. No. 14/016,992, filed Sep. 3, 2013, entitled, "Systems and Methods of Transmitter Protection for Wireless Communications," which is a continuation of Ser. No. 13/249,186 filed Sep. 29, 2011, entitled "Systems and Methods of Transmitter Protection for Wireless Communications," and now U.S. Pat. No. 8,526,895, which claims priority to U.S. Provisional Application Ser. No. 61/387,932 filed Sep. 29, 2010, entitled "Smart Transmitter Protection Schemes for Radio Optimized for Single RFU." All of the applications referenced in this paragraph are hereby incorporated by reference herein.

FIELD OF THE INVENTION(S)

The present invention(s) relate to wireless communications systems, and more particularly, some embodiments relate to systems and methods for wireless communications utilizing a transmitter protection scheme.

DESCRIPTION OF THE RELATED ART

In wireless communications systems, protection schemes are an essential component to ensuring overall availability and reliability of communications services. This is particularly true for radio backhaul networks (e.g., microwave or millimeter wave radio systems) which provide the necessary infrastructure for many of today's wireless communications networks. Unfortunately, due to network costs and technology limitations, there has been little to no recent development in the area of protection schemes for wireless communications. Naturally, many modern wireless communications systems are left to implement traditional protection schemes in order to achieve availability and reliability goals.

One such traditional protection scheme is 1+1 which provides radio link redundancy between two communications sites using two (often identical) transmitting radio frequency units. Under 1+1 protection, one transmitting radio frequency unit is in active mode (i.e., the main transmitting radio frequency unit) while the other is in stand-by mode (i.e., the secondary transmitting radio frequency unit) and remains muted. If the main transmitting radio frequency unit fails, the secondary transmitting radio frequency unit may switch to active mode and assume the role of the primary transmitter. Generally, performance suffers a time delay associated with switching from the main transmitting radio frequency unit to the secondary transmitting radio frequency unit.

FIG. 1 depicts a main active transmitting radio frequency unit (RFU) 102 and a secondary inactive backup transmitting RFU 104 with separate antennas 110 and 114 in the prior art. In an environment 100, a main active transmitting RFU 102 transmits data through the antenna 110 via the diplexer 108 to the wireless communication receiver 106. The secondary inactive backup transmitting RFU 104 may be muted or otherwise inactive. It is not uncommon that the secondary inactive backup transmitting RFU 104 is powered and ready to be made active thereby acting as a backup to the main active transmitting RFU 102.

If the main active transmitting RFU 102 fails or falls below an acceptable level of performance, the main active transmitting RFU 102 may be muted or may be inactivated. Subsequently, the secondary inactive backup transmitting RFU 204 may be activated. As a result, the formerly secondary inactive backup transmitting RFU 204 will become the primary transmitting unit and provide the signal to the antenna 114 via the diplexer 112 for transmission to the wireless communication receiver 106.

Another traditional protection scheme is 1+N protection. Like 1+1 protection, 1+N protection utilizes one transmitting RFU as the main transmitting RFU. 1+N protection differs from 1+1 protection in that, instead of having only one secondary backup transmitting RFU as a backup unit in stand-by mode, there are N number of secondary backup transmitting RFUs. Accordingly, 1+N protection provides additional levels of redundancy over 1+1 protection. Unfortunately, the time delay associated with switching from an active mode RFU to one of the stand-by mode RFUs still exists under 1+N protection.

SUMMARY OF EMBODIMENTS

Various embodiments provide for systems and methods for wireless communications that implement spatial combining. In some embodiments, a wireless communications system may comprise first and second transmitting radio frequency units. The first and second transmitting radio frequency units may be a part of a microwave communication system. In one example, the first and second transmitting radio frequency units are a part of a peer-to-peer microwave communication system.

The first transmitting radio frequency unit may have a first radio frequency path with the receiving radio frequency unit. The second transmitting radio frequency unit may also have a second radio frequency path with the receiving radio frequency unit. In some embodiments, the first transmitting radio frequency unit is configured to transmit a first wireless signal, having a first phase and a first amplitude, to the receiving radio frequency unit over the first radio frequency path. The second transmitting radio frequency unit may also be configured to transmit a second wireless signal, having a second phase and a second amplitude, to the receiving radio frequency unit over the second radio frequency path. The first transmitting radio frequency unit and the second transmitting radio frequency unit may be further configured to synchronize the first phase and the second phase, synchronize the first amplitude and the second amplitude, and transmit the first wireless signal and second wireless signal such that the first wireless signal and the second wireless signal spatially combine to form a beam, to the receiving radio frequency unit, that comprises the input signal. In some embodiments, synchronizing the first and second phase and/or gain comprises each transmitting radio frequency unit adjusting the phase and gain (i.e., amplitude) of a signal based on a comparison to a predetermined phase and gain.

In some embodiments, the first transmitting radio frequency unit and the second transmitting radio frequency unit implement a 1+1 protection scheme. In some embodiments, each transmitting radio frequency unit may continue to transmit a signal to a receiving radio frequency unit, or a plurality of receiving radio frequency units, even when one of the two transmitting radio frequency units has ceased transmission (e.g., due to equipment failure) or fallen below an acceptable standard of performance.

In various embodiments, where either the first or second transmitting radio frequency unit comprises a plurality of transmitting radio frequency units, the first transmitting radio frequency unit and the second radio frequency unit may implement a 1+N protection scheme. In some embodiments, one or more transmitting radio frequency units may continue to transmit the wireless signal to a receiving radio frequency unit, or a plurality of receiving radio frequency units, even when one or more of the transmitting radio frequency units has ceased transmission (e.g., due to equipment failure) or fallen below an acceptable standard of performance.

Spatially combining the first wireless signal and the second wireless signal to form the beam may involve adjusting the first phase and the second phase, or adjusting the first amplitude and the second amplitude. In some embodiments, adjusting the phase or the amplitude in a transmitting radio frequency unit may comprise adjusting an in-phase component of a baseband signal or adjusting a quadrature component of the same baseband signal.

In some embodiments, the first transmitting radio frequency unit and the second transmitting radio frequency unit may belong to an analog beamforming network where, for example, each of the first transmitting radio frequency unit and the second frequency unit may comprise a phase shifter module configured to adjust a phase, and an AGC module configured to adjust an amplitude. In various embodiments, the first transmitting radio frequency unit and the second transmitting radio frequency unit may belong to a digital beamforming network. In some embodiments, each of the first and second transmitting radio frequency units may adjust the in-phase component of a baseband signal used in the generation of a wireless signal, or adjust the quadrature component of the same baseband signal.

According to various embodiments, an exemplary method may comprise receiving an input signal to be transmitted, generating a plurality of individual wireless signals from the input signal, wherein each individual wireless signal of the plurality of individual wireless signals has a phase and a amplitude, adjusting the phase of each individual wireless signal of the plurality of individual wireless signals such that the phase matches, or meets a condition based on, a predetermined phase value, wherein the predetermined phase enables the plurality of individual wireless signals to spatially combine to form a beam, adjusting the amplitude of each individual wireless signal of the plurality of individual wireless signals such that the amplitude matches, or meets a condition based on, that a predetermined gain value of all other individual wireless signals of the plurality of individual wireless signals, wherein the predetermined gain value enables the plurality of individual wireless signals to spatially combine to form the beam comprising the input signal to be transmitted, and transmitting each individual wireless signal of the plurality of individual wireless signals over a wireless channel to the receiving radio frequency unit such that the plurality of individual wireless signals spatially combine to form a beam, over the wireless channel, that comprises the input signal to be transmitted.

The method may further comprise determining the predetermined phase value and the predetermined gain value (i.e., predetermined gain value) for the plurality of individual wireless signals such that the predetermined phase and the predetermined gain enable the plurality of individual wireless signals to spatially combine to form the beam comprising the input signal. Depending on the embodiment, this determination may happen before the phase or the amplitude of each individual wireless signal of the plurality of individual wireless signals is adjusted.

In some embodiments, the method may further comprise determining a new predetermined phase value or a new predetermined gain value for the plurality of individual wireless signals when an individual wireless signal is added to or removed from the plurality of individual wireless signals, wherein the new predetermined phase value or the new predetermined gain value enables the plurality of individual wireless signals to spatially combine to form the beam comprising the input signal. For example, where each of the plurality of individual wireless signals is being transmitted by a separate transmitting radio frequency units, and one or more of those separate transmitting radio frequency units eventually stops transmitting (e.g., due to a component failure) or falls below an acceptable level of performance, there may be fewer individual wireless signals being transmitted. To compensate for this addition or removal of an individual wireless signal from the plurality of individual wireless signals, a method in accordance with some embodiments may determine a new predetermined phase value or a new predetermined gain value for the plurality of individual wireless signals such that the plurality of individual wireless signals can still form a beam carrying the input signal to be transmitted.

Depending on the embodiment, each individual wireless signal of the plurality of individual wireless signals may be transmitted over the wireless channel simultaneously, or in some alternative sequence.

Additionally, in some embodiments, when an individual wireless signal is added to or removed from the plurality of individual wireless signals, the method may further comprise readjusting the phase or the amplitude of each remaining wireless signal of the plurality of individual wireless signals still being transmitted. Depending on the embodiment, the phase and amplitude may be readjusted to respectively match, or meet a condition based on, a new predetermined phase or a new predetermined gain, where the new predetermined phase and the new predetermined gain enable a beam carrying the input signal to be formed.

According to some embodiments, an exemplary system comprises a means for transmitting a first wireless signal the receiving radio frequency unit, the first wireless signal having a first phase and a first amplitude; a means for transmitting a second wireless signal the receiving radio frequency unit, the second wireless signal having a second phase and a second amplitude, a means for synchronizing the first phase with the second phase, a means for synchronizing the first amplitude with the second amplitude, and a means for spatially combining the first wireless signal and the second wireless signal to form a beam, to the receiving frequency unit, that comprises the input signal. In some embodiments, the means for transmitting the first wireless signal and the means for transmitting the second wireless signal may implement a 1+1 protection scheme with the receiving radio frequency unit.

In some embodiments, the system may further comprise a means for adjusting the first phase, and a means for adjusting the second phase, where the means for adjusting the first phase and the means for adjusting the second phase are used to spatially combine the first wireless signal and the second wireless signal to form the beam. Additionally, in some embodiments, the system may further comprise a means for adjusting the first amplitude, and a means for adjusting the second amplitude. Depending on some embodiments, the means for adjusting the first amplitude and the means for adjusting the second amplitude may be used to spatially combine the first wireless signal and the second wireless signal to form the beam.

In some embodiments, the wireless communications system may further comprise a means for transmitting N−1 wireless signals to the receiving radio frequency unit, the N−1 wireless signals having a third phase and a third amplitude, a means for synchronizing the third phase with the first phase and the second phase, a means for synchronizing the third amplitude with the first amplitude and the second amplitude, and a means for spatially combining the N−1 wireless signals with the first wireless signal and the second wireless signal to form the beam. In some such embodiments, the means for transmitting the first wireless signal, the means for transmitting the second wireless signal, and the means for transmitting the N−1 wireless signals may be used to implement a 1+N protection scheme with the receiving radio frequency unit.

According to some embodiments, various steps described herein may be implemented using a digital device. For instance, some embodiments provide for a computer program product comprising a computer readable medium (e.g., a hard drive, optical medium, floppy disk, thumbdrive, or the like) having computer program code embodied therein for causing a computing device (i.e., a digital device) to perform specific steps described herein.

Other features and aspects of various embodiments will become apparent from the following detailed description, taken in conjunction with the accompanying drawings, which illustrate, by way of example, the features of the various embodiments.

DETAILED DESCRIPTION OF VARIOUS EMBODIMENTS

In various embodiments, systems and methods for wireless communications that implement a transmitter protection scheme using spatial combining are discussed herein. Various wireless communications systems include, for example, microwave wireless systems, cellular phone systems, and WiFi systems. The protection scheme implemented by some embodiments may provide any number of benefits, including but not limited to, hitless protection, constant power monitoring for each wireless channel, extra gain, beam steering capabilities, beam hopping capabilities, beam alignment capabilities, and/or varying levels of transmission path protection (e.g., 1+1 protection, or 1+N protection).

Figure 1:
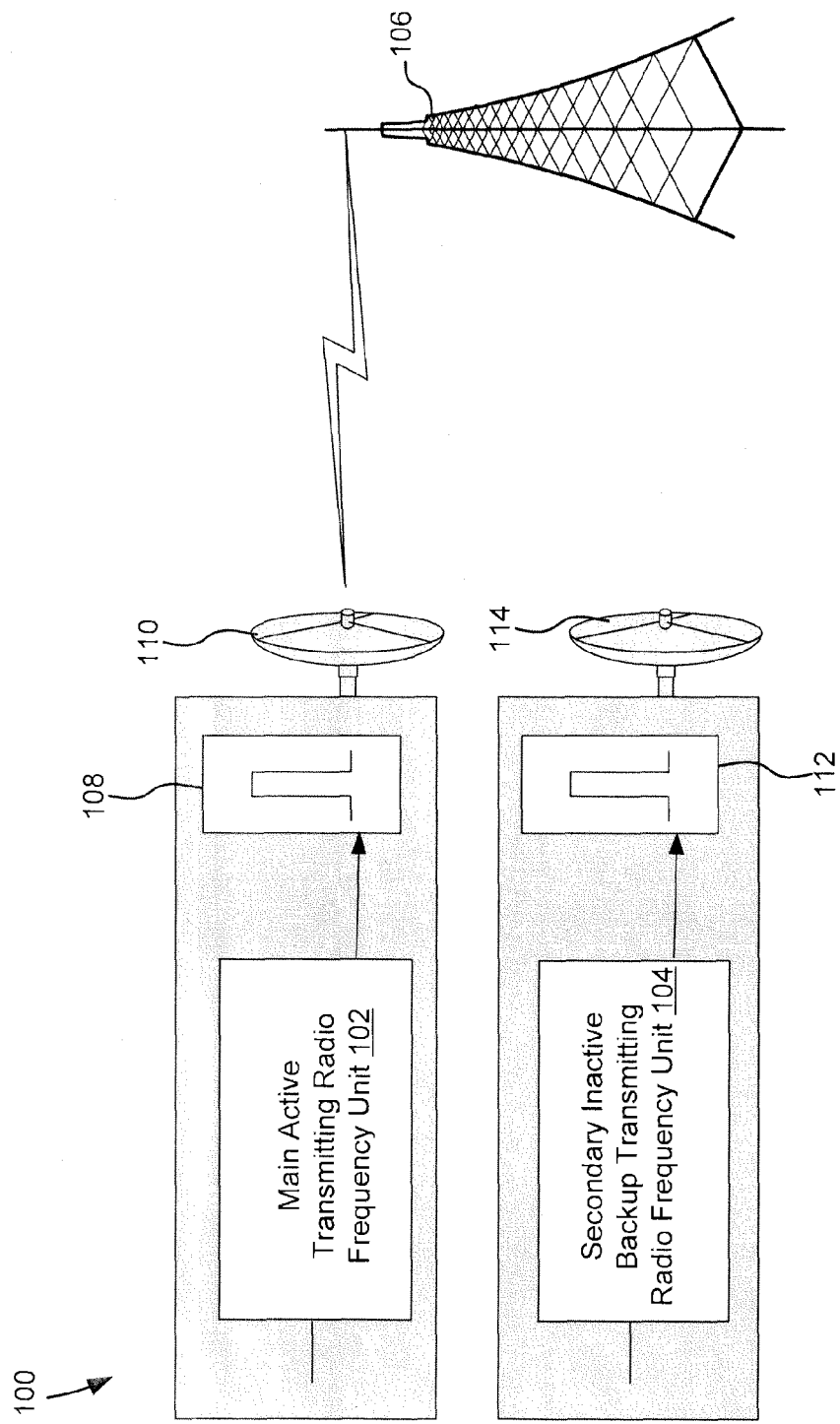
FIG. 1 depicts a main active transmitting radio frequency unit (RFU) and a secondary inactive backup transmitting RFU with separate antennas in the prior art.
Figure 2:
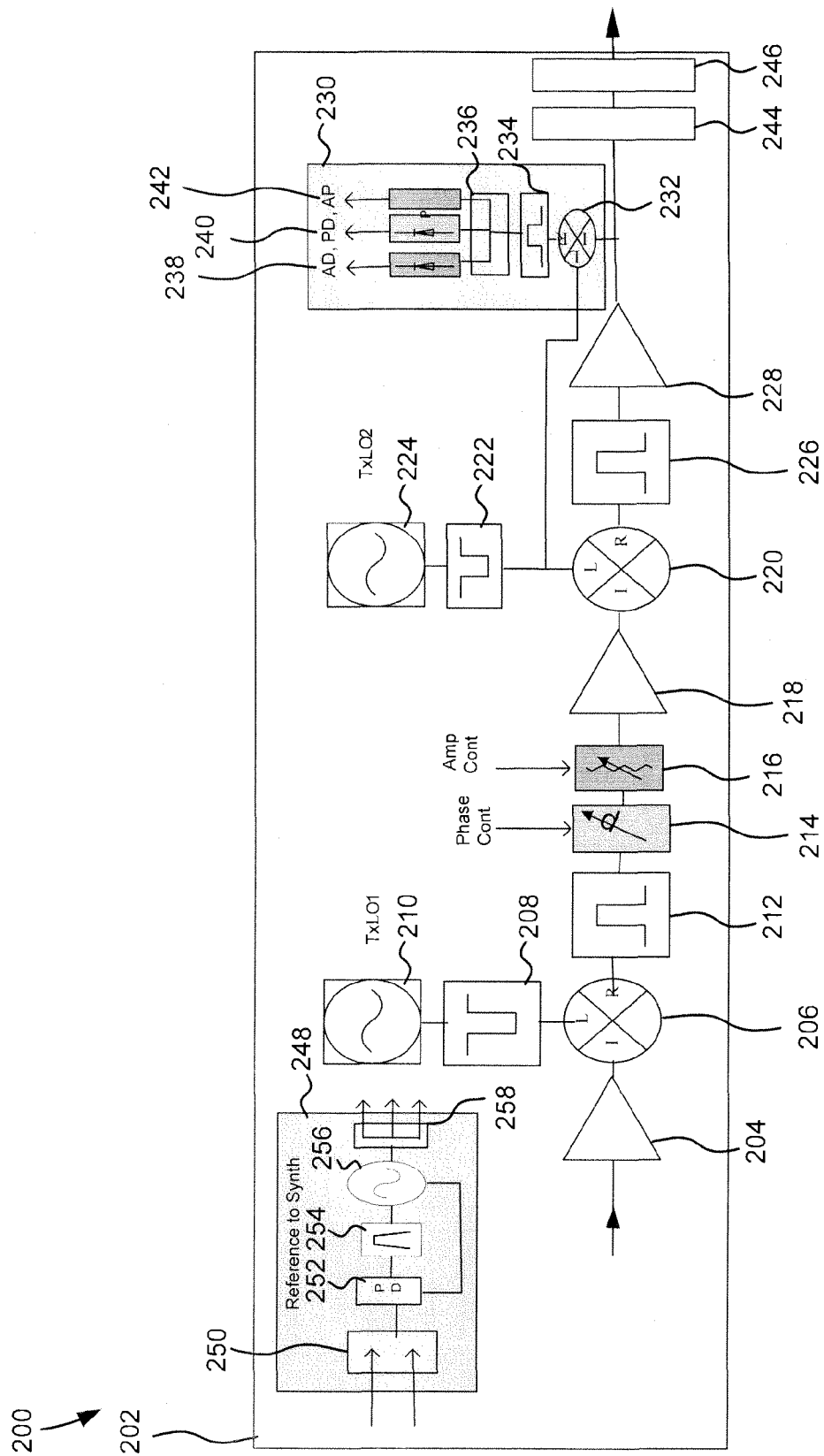
FIG. 2 is a diagram illustrating an exemplary system including a transmitting radio frequency unit in accordance with some embodiments.

FIG. 2 is a diagram illustrating an exemplary system 200 including a transmitting radio frequency unit 202 in accordance with some embodiments. The transmitting radio frequency unit 202 may comprise amplification/attenuation modules 204, 218, and 228, mixer modules 206, 220, and 232, oscillator modules 210 and 224, filter modules 208, 212, 222, 226, and 234, a phase adjuster 214, an AGC module 216, a signal quality module 230, a waveguide filter 244, and a waveguide 246.

The amplification/attenuation modules 204, 218, and 228 may comprise an amplifier and/or an attenuator configured to amplify and/or attenuate a signal. The amplification/attenuator modules 204, 218, and 228 may be any kind of amplifiers and/or attenuators. Further, the amplification/attenuator modules 204, 218, and 228 may each comprise amplifiers and/or attenuators with any kind of electrical properties.

In some embodiments, the amplifier/attenuator module 204 receives a signal from a modem or DSP. The amplifier/attenuator module 218 may receive a signal from the AGC module 216. Further, the amplifier/attenuator module 228 may attenuate the signal (or components of the signal) after the signal has been upconverted by the mixer module 220, the filter module 222, and the oscillator module 224. The amplifier/attenuator module 228 may then provide the signal to the signal quality module 230 and/or the waveguide filter 244. The amplifier/attenuator modules 204, 218, and 228 may amplify or attenuate the signal.

Those skilled in the art will appreciate that each of the amplifier/attenuator modules 204, 218, and 228 may be the same as one or more other amplifier/attenuator modules. For example, amplifier/attenuator modules 204, 218, and 228 may both be amplifiers sharing the same electrical properties. In another example, amplifier/attenuator modules 204, 218, and 228 may both be amplifiers but have different electrical properties.

Each amplifier/attenuator module 204, 218, and 228 may include one or more components. For example, the amplifier/attenuator module 204 may comprise one or more amplifiers and/or attenuators.

The mixer module 206, filter module 208, and the oscillator module 210 may represent an upconverter configured to upconvert one or more signals from the amplifier/attenuator module 204 to an intermediate frequency (IF) signal. Similarly, the mixer module 220, filter module 222, and oscillator module 224 also may represent an upconverter configured to further upconvert the IF signal to an RF signal. Those skilled in the art will appreciate that there may be any number of upconverters configured to upconvert the signals within the transmitting radio frequency unit 202.

The mixer modules 206, 220, and 232 may comprise mixers configured to mix signal(s) with one or more other signals. The mixer modules 206, 220, and 232 may comprise many different types of mixers with many different electrical properties. In one example, the mixer module 206 mixes a signal received from the amplifier/attenuator module 204 with the filtered oscillating signal from the filter module 208 and the oscillator module 210. In another example, the mixer module 220 mixes a signal received from the amplifier/attenuator module 218 with the filtered oscillating signal from the filter module 222 and the oscillator module 224. The mixer module 232 may mix a signal received from the oscillator module 224 with the RF signal from the amplifier/attenuator module 228.

Those skilled in the art will appreciate that each of the mixers 206, 220, and 232 may be the same as one or more other mixer modules. For example, mixer modules 206, 220, and 232 may both be mixers sharing the same electrical properties or, alternately, the mixer modules 206, 220, and 232 may be another kind of mixer and/or with different electrical properties.

Each mixer modules 206, 220, and 232 may include one or more components. For example, the mixer module 206 may comprise one or more mixers.

The filter modules 208, 212, 222, 226, and 234 may comprise filters configured to filter the signal. The filter modules 208, 212, 222, 226, and 234 may comprise many different types of filters (e.g., bandpass filter, low pass filter, high pass filter, or the like) with many different electrical properties. In one example, the filter module 208 may be a band pass filter configured to filter the oscillation signal (or components of the signal) provided from the oscillator module 210. Similarly, filter modules 212, 222, 226, and 234 may filter signals (or components of the signals) from the mixer module 206, oscillator module 224, the mixer module 220, or the mixer module 232, respectively.

Those skilled in the art will appreciate that each of the filter modules 208, 212, 222, 226, and 234 may be the same as one or more other filter modules. For example, filters module 208 and 212 may both be filters sharing the same electrical properties while filter module 222 may be another kind of filter. In another example, filters module 208 and 212 may both be filters of a similar type but have different electrical properties.

Each filter modules 208, 212, 222, 226, and 234 may include one or more components. For example, the filter modules 208 may comprise one or more filters.

The oscillator modules 210 and 224 may comprise oscillators configured to provide an oscillating signal that may be used to upconvert the signal. The oscillator modules 210 and 224 may comprise any kind of oscillator with any different electrical properties. In one example, the oscillator module 210 provides an oscillating signal to the filter module 208. The oscillator module 224 may provide an oscillating signal to the filter module 222.

The oscillator modules 210 and 224, either individually or together, may be local or remote. In one example, the oscillating module 210 and/or the oscillating module 224 may be remotely located and configured to provide an oscillating signal to one or more transmitting radio frequency units. In some embodiments, a single oscillating module may provide an oscillating signal to the mixer modules 206, 226, and/or 234, respectively (e.g., optionally via a filter). In one example, the oscillator signal from an oscillator module may be altered (e.g., oscillation increased or decreased) and provided to a different part of the circuit.

Those skilled in the art will appreciate that each of the oscillator modules 210 and 224 may be the same as each other. For example, oscillator modules 210 and 224 may both be oscillators sharing the same electrical properties or, alternately, the oscillator modules 210 and 224 may be another kind of oscillator and/or with different electrical properties.

Each oscillator modules 210 and 224 may include one or more components. For example, the oscillator module 210 may comprise one or more oscillators.

The signal quality module 230 may be configured to generate a phase control signal to control the phase of a processed signal. In one example, the mixer module 232 receives the upconverted RF signal from the amplifier/attenuator module 228 and mixes the amplified or attenuated signal with the filtered oscillator signal or the upconverted signal from the second upconverter (e.g., mixer module 220, filter module 222, and oscillator module 224). The filter module 234 may filter the signal. A splitter 236 may split the signal to a phase comparator and a gain comparator. The phase comparator may compare the phase of the signal from the splitter 236 to a predetermined phase value to generate a phase control signal that may control the phase adjuster 214. The gain comparator may compare the gain (i.e., amplitude) of the signal from the splitter 236 to a predetermined gain value to generate a gain control signal that may control the AGC module 216

The phase adjuster 214 may comprise a variable phase control circuit configured to increase or decrease the phase of the signal to be transmitted. The phase adjuster 214 may comprise any different type of phase adjuster or phase shifter with different electrical properties. In one example, the phase adjuster 214 increases or decreases the phase of the signal received from the filter module 218. The phase adjuster 214 may adjust the phase of the signal based on the phase control signal from the signal quality module 230.

The phase adjuster 214 may include one or more components. For example, the phase adjuster 214 may comprise one or more phase control elements.

The AGC module 216 may comprise an automatic gain control (AGC) circuit configured to increase or decrease the gain of the signal received from the phase adjuster 214. The AGC module 216 may comprise many different types of AGCs with many different electrical properties. In one example, the AGC module 216 increases or decreases the gain of the signal received from the phase adjuster 214. The AGC module 216 may adjust the gain of the signal based on the gain control signal.

The AGC module 216 may include one or more components. For example, the AGC module 216 may comprise one or more AGCs.

In some embodiments, the predetermined phase value and amplitude value may be the same or substantially similar as the phase and amplitude of the wireless signals outputted by one or more other transmitting radio frequency units. In one example, the phase and the amplitude of one or more transmitting radio frequency unit may be synchronized.

In some embodiments, the transmitting radio frequency unit 202 may comprise the waveguide filter 244, the waveguide 246, and/or a diplexer. The waveguide filter 244 may be any filter coupled to the waveguide 246 and configured to filter the electromagnetic waves (e.g., remove noise). The waveguide 246 may provide the signal to the antenna via a diplexer. The diplexer may provide the signal to the antenna. The waveguide 246 may be any waveguide kind or type of waveguide. For example, the waveguide 246 may be hollow or dielectric. In some embodiments, the waveguide 246 comprises a rectangular to circular waveguide.

In some embodiments, the transmitting radio frequency unit 202 and one or more other transmitting radio frequency units are coherent transmitters. Reference signal module 248 may provide a reference signal in a coherent transmitting radio frequency unit 202. In some embodiments, the reference signal module 248 receives one or more signals (e.g., I and Q signals) and passes the signals through a phase lock loop comprising a phase detector 252, filter module 254, and oscillator module 256. The phase detector 228 may detect the phase of the incoming signals and/or compare the phase to that of the oscillator signal of oscillator module 256. The signal may be filtered by filter module 254. The phase may be corrected until the desired phase of the reference signal is reached before providing the reference signal(s) via the splitter 258.

In various embodiments, the oscillator module 256 shares the oscillator signal with one or more other reference signal modules of other transmitting radio frequency units. The oscillator 256 may also provide an oscillator signal to the filter module 208 and/or the filter module 222 thereby making oscillator modules 210 and/or 224 unnecessary.

In some embodiments, the amplification/attenuation module 204 receives the input signal from a modem and provides an amplified input signal to the mixer 206. The mixer module 206 may up-convert the amplified input signal to a higher intermediate frequency (IF) signal. In one embodiment, the mixer module 206 may use a filtered signal provided by the oscillator module 210 and the filter module 208 (e.g., bandpass filter) to up-convert the amplified input signal to the IF signal.

Subsequently, the filter module 212 may filter the IF signal. The filtered, IF signal may then be adjusted by the phase adjuster 214 and/or the AGC module 216. As noted herein, in some embodiments, the phase and/or amplitude of the filtered, IF signal may be adjusted based on a radio frequency (RF) detected by the signal quality module 230.

Next, the signal provided by the phase adjuster 214 and the AGC module 216 may be amplified or attenuated by the amplification/attenuation module 218, before being up-converted to the radio frequency (RF) signal by the mixer module 220. The mixer module 220 may utilize a filtered signal provided by the oscillator module 224 and the filter module 222. The RF signal may be further filtered by the filter module 226 and amplified or attenuated by the amplification/attenuation module 228 before being provided to the optional waveguide filter 244 and optional waveguide 246.

As the amplified RF signal is provided to the antenna via the optional waveguide filter 244 and waveguide 246, the phase and amplitude of the amplified RF signal may be detected and measured by the signal quality module 230. In some embodiments, the signal quality module 230 may be configured to compare the measured phase and amplitude values of the RF signal against predetermined phase and amplitude values, and to instruct various components of the transmitting radio frequency unit 202 to adjust the phase or amplitude of the signal to match, approximately match, or meet a condition based on the predetermined values. In some embodiments, the predetermined phase and amplitude values may be set such that they match, or meet a condition based on, the phase and amplitude of one or more RF signals outputted by the other transmitting radio frequency units. In doing so, some embodiments may facilitate synchronization of phase and amplitude between the transmitting radio frequency units.

The antenna may receive the RF signal from the amplification/attenuation module 228 via a diplexer configured to implement passive, frequency domain multiplexing for RF signals to be transmitted as well as for RF signals received by the antenna module 138.

An antenna may transmit the RF signal to one or more receiving radio frequency units. In various embodiments, the antenna may be configured to transmit the RF signal so that the RF signal spatially combines with RF signals transmitted (i.e., outputted) by other radio frequency units.

In various embodiments, by utilizing the signal quality module 230, phase adjuster 214, and/or AGC module 216, an output phase and amplitude of the transmitter may be accurately measured, controlled, and set.

It will be appreciated that a "module" may comprise software, hardware, firmware, and/or circuitry. In one example, one or more software programs comprising instructions capable of being executable by a processor may perform one or more of the functions of the modules described herein. In another example, circuitry may perform the same or similar functions. Alternative embodiments may comprise more, less, or functionally equivalent modules and still be within the scope of present embodiments. For example, as previously discussed, the functions of the various modules may be combined or divided differently.

Figure 3:
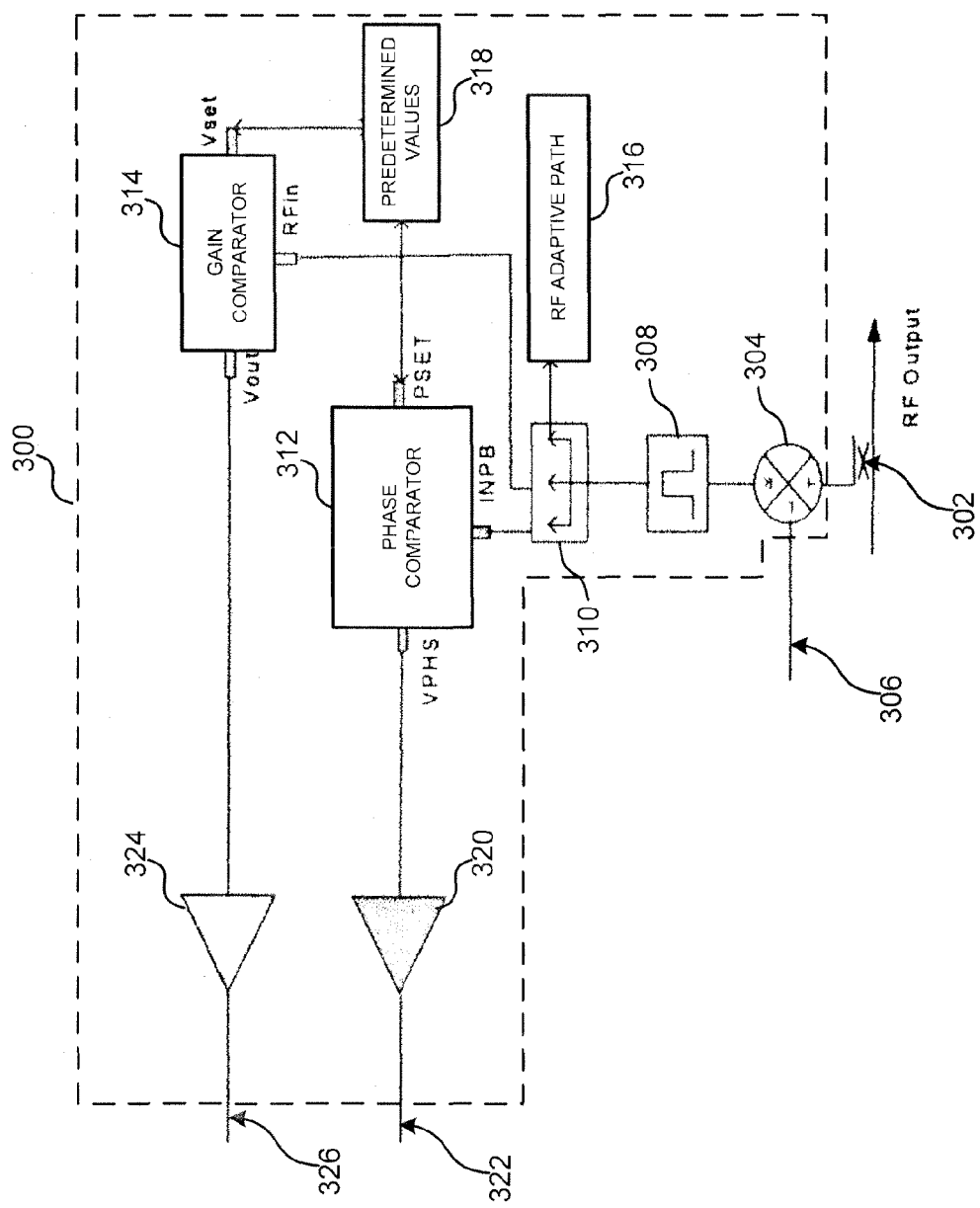
FIG. 3 is a block diagram of a signal quality module for controlling both phase and gain of the signal in some embodiments.

FIG. 3 is a block diagram of a signal quality module 300 for controlling both phase and gain of the signal in some embodiments. Different transmitting radio frequency units may use different signal quality modules. In some embodiments, only the phase is adjusted in the manner described herein. In various embodiments, both the phase and the gain are adjusted in this manner. In that instance, the transmitting radio frequency unit may comprise the signal quality module 300 of FIG. 3. In still other embodiments, the transmitting radio frequency unit may only adjust gain in this manner. In that instance, the transmitting radio frequency unit may include the gain comparator but not the phase comparator.

The signal quality module 300 may comprise a mixer module 304, a filter module 308, a splitter 310, a phase comparator 312, a gain comparator 314, an RF adaptive path module 316, an amplifier/attenuator module 320, and an amplifier/attenuator module 324.

The mixer module 304 of the signal quality module 300 may receive an oscillator signal (e.g., from oscillator module 210, 224, or 256) via path 306 and an RF signal via path 302. The RF signal may be received by a coupler. In various embodiments, by mixing the RF signal with the oscillator signal, the frequency of the signal may be reduced. As such, the phase comparator and/or the gain comparator may be less expensive than comparators that are required to function with higher frequency signals.

The filter module 308 filters the mixed signal from the mixer module 304 and provides the signal to the splitter 310. The splitter 310 may split and provide the signal to the phase comparator 312, the gain comparator 314, and the RF adaptive path module 316. In some embodiments, the filter module 308 is optional.

Figure 5:
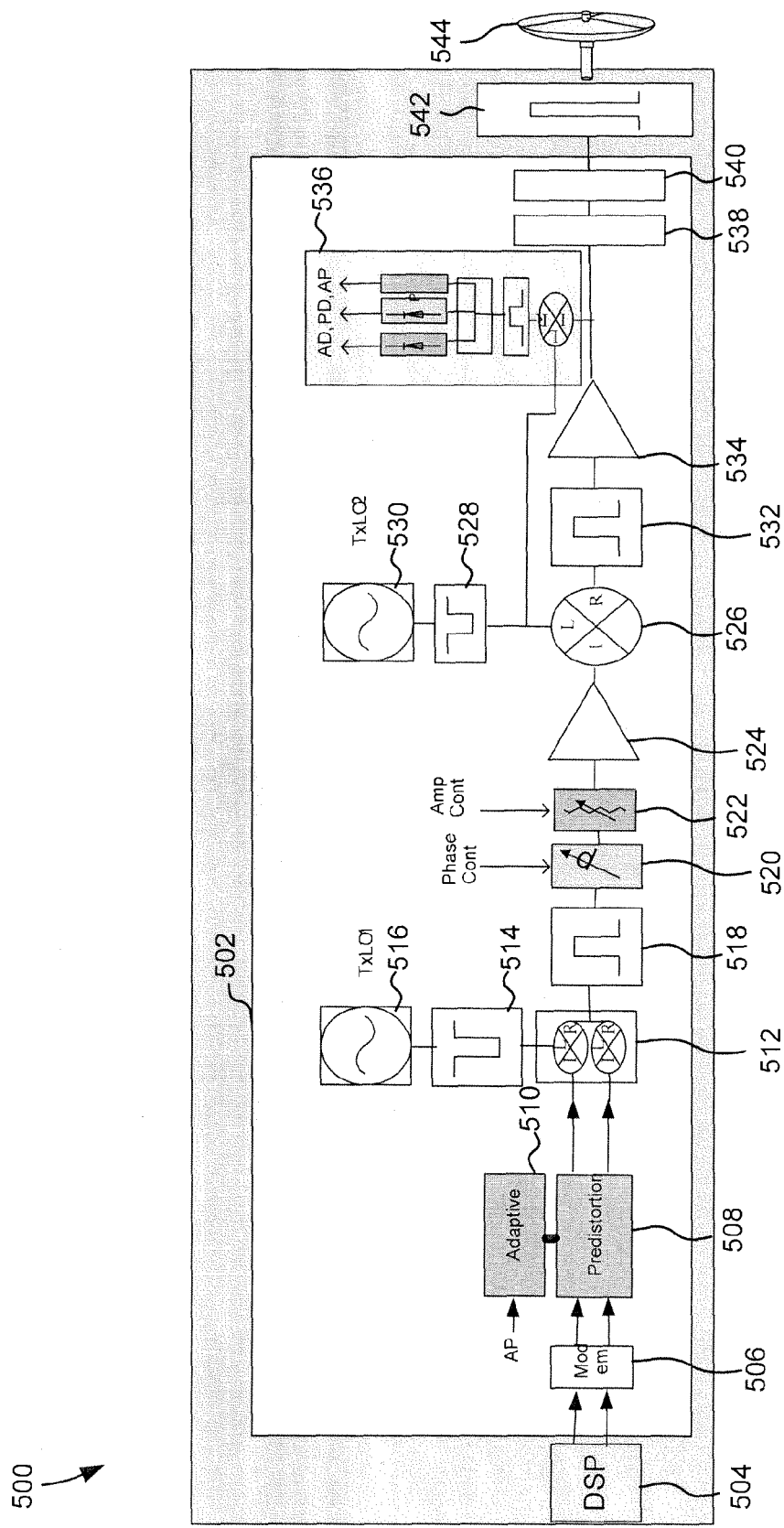
FIG. 5 depicts another transmitting radio frequency unit in some embodiments.

Those skilled in the art will appreciate that a legacy transmitting radio frequency unit may comprise the mixer module 304, filter module 308, and RF adaptive path module 316 for providing the necessary signal to an adaptive module (see FIG. 5). As a result, adding the splitter 310, the phase comparator 312, and/or the gain comparator 314 to preexisting equipment may allow for the leveraging power from multiple transmitters but with less expense.

The phase comparator 312 may be a chip, a processor, or a module configured to compare the phase of the signal from the splitter 310 with the predetermined phase value from the predetermined values module 318. In one example, the phase comparator 312 may be an RF/IF detector. The phase comparator 312 generates a phase control signal based on the comparison and the amplifier/attenuator module 320 amplifies or attenuates the phase control signal before providing the phase control signal to the phase adjuster.

Like the phase comparator 312, the gain comparator 314 may be a chip, a processor, or a module configured to compare the gain of the signal from the splitter 310 with the predetermined gain value from the predetermined values module 318. In one example, the gain comparator 314 generates a gain control signal based on the comparison and the amplifier/attenuator module 324 amplifies or attenuates the phase control signal before providing the gain control signal to an AGC module. The phase control signal and the gain control signal may be provided over paths 322 and 326, respectively.

The RF adaptive path module 316 may receive the signal from the splitter 310 and provide the adaptive signal to the adaptive module. The predetermined values module 318 may be any storage (e.g., computer readable media) that stores the predetermined phase value and the predetermined gain value.

The predetermined phase value and/or the predetermined gain value may be set within the predetermined values module in any number of ways. In various embodiments, a user may set the predetermined phase value and/or the predetermined gain value within a chip. In some embodiments, a pilot signal is sent to one or more transmitting radio frequency units. The phase comparator 808 may set the predetermined phase value and/or the predetermined gain value based on the pilot signal.

In various embodiments, one transmitting radio frequency unit may receive the predetermined phase value and/or the predetermined gain value from another transmitting radio frequency unit. For example, a first transmitting radio frequency unit may request the predetermined phase value and/or the predetermined gain value from a digital device and/or another transmitting radio frequency unit. The digital device or transmitting radio frequency unit may provide the predetermined phase value and/or the predetermined gain value to the requesting transmitting radio frequency unit. In some embodiments, a transmitting radio frequency unit provides the predetermined phase value and/or the predetermined gain value to one or more other predetermined phase value (e.g., when the transmitting radio frequency unit changes, at predetermined intervals, or upon request by a user).

The gain and/or the phase of a signal may be adjusted at any point within the transmitting radio frequency unit. Further, the gain and/or the phase of the signal may be adjusted any number of times. In one example, the phase of the signal is adjusted multiple times based on the same phase control signal. In another example, the phase of the signal is compared multiple times to one or more predetermined phase values and adjusted based on the comparison.

Although the signal quality module 300 is described as receiving an oscillator signal and a RF signal via the mixer module 304, those skilled in the art will appreciate that the signal quality module 300 may receive only one signal or more than one signal. For example, the mixer module 304 may be optional and the signal quality module 300 may filter and compare the phase and/or gain of a signal from any part of the circuit of the transmitting radio frequency control module. In some embodiments, the signal quality module 300 may receive an oscillator signal or a filtered oscillator signal from any oscillator, including an oscillator that is part of the reference signal module or from another transmitting radio frequency unit. Further, the signal quality module 300 may mix the oscillator module with the IF signal, RF signal, or any signal received by the modem.

Figure 4:
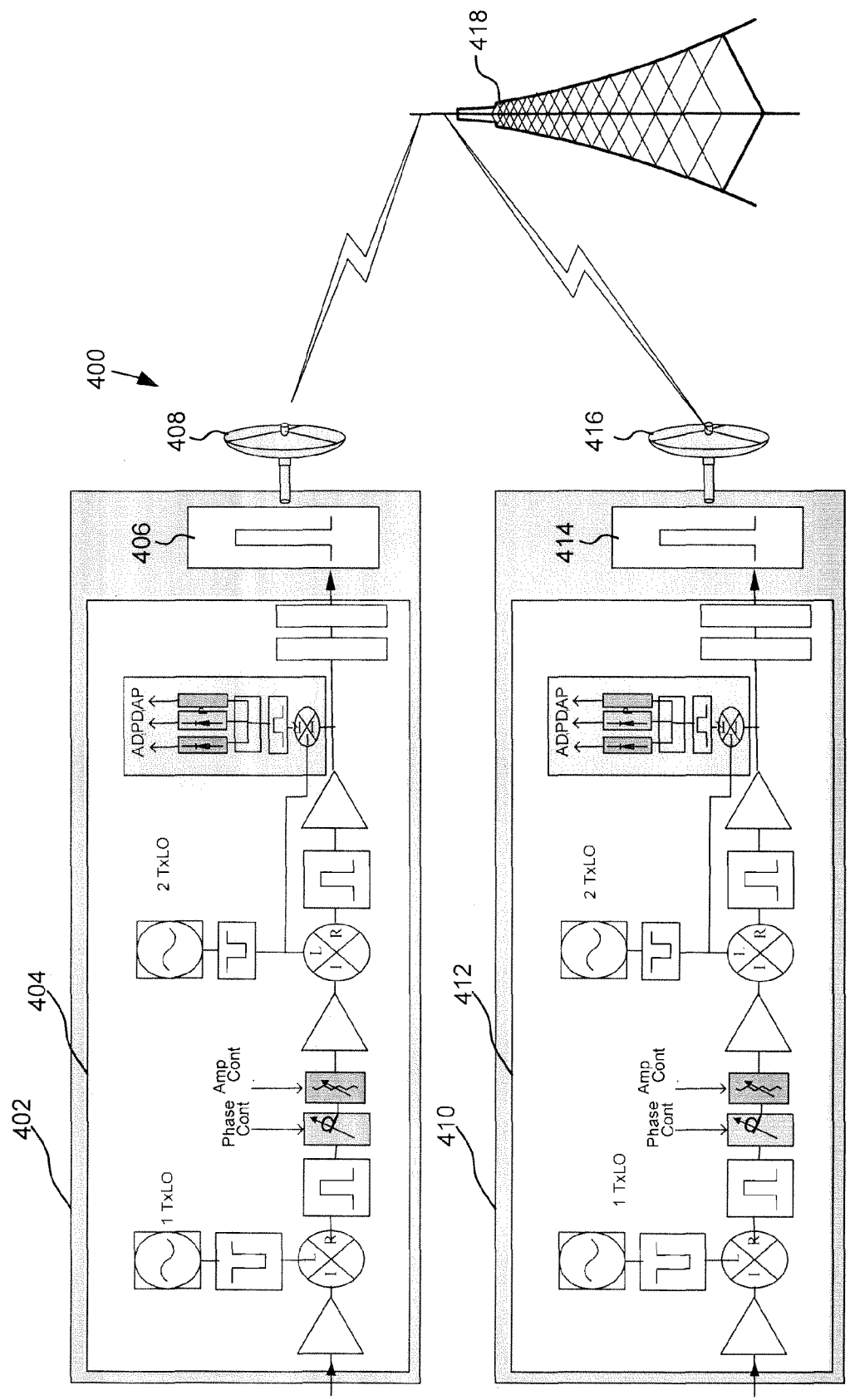
FIG. 4 depicts two transmitting radio frequency units in some embodiments

FIG. 4 depicts two transmitting radio frequency units 404 and 412 in some embodiments. The system 400 may be configured such that each of the transmitting radio frequency units 404 and 412 transmit a separate wireless signal such that the signals spatially combine. In some embodiments, radio enclosure 402 comprises the transmitting radio frequency unit 404. Similarly, the radio enclosure 410 comprises transmitting radio frequency unit 412. The transmitting radio frequency unit 404 may provide a signal to the antenna 408 via the diplexer 406 for transmission to the receiver 418. Similarly, the transmitting radio frequency unit 412 may provide a signal to the antenna 416 via the diplexer 414 for transmission to the receiver 418. The signals from both receivers may be substantially the same gain and phase. As a result, the signals may be stronger when both transmitting radio frequency units are actively transmitting.

In one example, a wireless signal spatially combines with one or more other wireless signals from the other transmitting radio frequency units to form a beam carrying the same input signal. Each wireless signal may have synchronized phase and amplitude with one or more other wireless signals from any number of transmitting radio frequency units. In some embodiments, each wireless signal may have a phase and amplitude that is synchronized with predetermined values (e.g., set by a user, or set according to the phase and amplitude output of a designated transmitting radio frequency unit 404 or 412).

In some embodiments, the system 400 implements a protection scheme that utilizes radio link redundancy. For instance, the system 400 may be capable of 1+1 protection for the radio link between a transmitting communications site and a receiving communications site, where both of the transmitting radio frequency units are in active mode and transmitting simultaneously or nearly simultaneously. In one example, if one transmitting radio frequency unit 402 fails, the other transmitting radio frequency unit 410 may continue to transmit. As a result, each transmitting RFU is protected by the other. In some embodiments, the protection is hitless.

Those of skill in the art will appreciate that the transmitting radio frequency units 404 and 412 may comprise components that are similar to those described with respect to the transmitting radio frequency unit 202 (see FIG. 2). For example, transmitting radio frequency units 404 and 412 may comprise a transmission path that is similar to that of the transmitting radio frequency unit 202. Further, the transmitting radio frequency units 404 and 412 may provide similar functionality as the transmitting radio frequency unit 202.

The antennas 408 and 416 may comprise any kind of antennas. In some embodiments, the antennas 408 and 416 are a part of an array of antennas, or may be a plurality of antennas that form an array of antennas. In some embodiments, the antennas 408 and 416 may comprise a phased array antenna or a portion of a phased array antenna. The array of antennas may be configured as a planar array of antennas (e.g., 3×4 planar array of antennas) or a linear array of antennas (e.g., 1×4 linear array of antennas). Each of the antennas 408 and 416 may comprise a similar to dissimilar type of antenna to each other. Further, one antenna may comprise different electrical properties than the others. Those skilled in the art will appreciate that there may be any number of antennas and any number of transmitting radio frequency units.

FIG. 5 depicts another transmitting radio frequency unit 502 in some embodiments. The transmitting radio frequency unit 502 may comprise a digital signal processor (DSP) 504, a modem module 506, a predistortion module 508, an adaptive module 510, mixer modules 512 and 526, filter modules 514, 518, 528, and 532, oscillator modules 516 and 530, a phase adjuster 520, an automatic gain control (AGC) module 522, amplification/attenuation modules 524 and 534, a signal quality module 536, waveguide filter 538, and waveguide 540.

The DSP 504 is any processor configured to provide one or more signals to the modem module 506. The digital signal processor (DSP) module 504 may comprise a digital signal processor, or another digital device, configured to receiving a source signal intended for transmission and converting the source signal to corresponding in-phase (I) and quadrature (Q) signals. For instance, the DSP module 504 may be implemented using a digital device (e.g., a device with a processor and memory). Instructions stored on the storage system may instruct the DSP module 504 to receive an input signal from a communications network interface, convert the input signal to corresponding the in-phase (I) and quadrature (Q) signals, and provide the corresponding in-phase (I) and quadrature (Q) signals.

The modem module 506 may be any modem configured to receive one or more signals to be transmitted. The modem module 506, in one example, may receive an in-phase (I) and quadrature (Q) signals and provide the signals to the predistortion module 508. The modem module 506 may comprise a modem device, or another digital device. The modem module 506 may be configured to receive in-phase (I) and quadrature (Q) signals and modulate the in-phase (I) and quadrature (Q) signals to encode the information.

The predistortion module 508 may receive the signal from the modem module 506 and improve the linearity of the signal. In various embodiments, the predistortion module 508 inversely models gain and phase characteristics and produces a signal that is more linear and reduces distortion. In one example, "inverse distortion" is introduced to cancel nonlinearity. The predistortion module 508 may receive a predistortion control signal from the adaptive module 510. The adaptive module 510 may provide the predistortion control signal based on the sample from the signal quality module 536 described herein. The predistortion module 508 may provide the I and Q signals to the mixer module 512.

The mixer module 512, filter module 514, and the oscillator module 516 may represent an upconverter configured to upconvert the signals to an intermediate frequency signal. Similarly, the mixer module 526, filter module 528, and oscillator module 530 also may represent an upconverter configured to further upconvert the signal to an RF signal. Those skilled in the art will appreciate that there may be any number of upconverters configured to upconvert the signals within the transmitting radio frequency unit 502.

The mixer modules 512 and 526 may comprise mixers configured to mix the signal(s) provided by the modem with one or more other signals. The mixer modules 512 and 526 may comprise many different types of mixers with many different electrical properties. In one example, the mixer 512 mixes I and Q signals received from the filter module predistortion module 508 with the filtered oscillating signal from the filter module 514 and the oscillator module 516. In another example, the mixer module 526 mixes a signal received from the amplifier/attenuator module 524 with the filtered oscillating signal from the filter module 528 and the oscillator module 530. One or more of the mixer modules 512 and 526 may be similar to one or more mixer modules 206, 220, and 232 of FIG. 2.

The filter modules 514, 518, 528, and 532 may comprise filters configured to filter the signal. The filter modules 514, 518, 528, and 532 may comprise many different types of filters (e.g., bandpass filter, low pass filter, high pass filter, or the like) with many different electrical properties. In one example, the filter module 514 may be a band pass filter configured to filter the oscillation signal (or components of the signal) provided from the oscillator module 516. Similarly, filter modules 514, 518, 528, and 532 may filter signals (or components of the signals) from the oscillator module 516, the oscillator module 530, the mixer module 512, or the mixer module 526, respectively. One or more of the filter modules 514, 518, 528, and 532 may be similar to one or more filter modules 208, 212, 222, 226, and 234 of FIG. 2.

The oscillator modules 516 and 530 may comprise oscillators configured to provide an oscillating signal that may be used to upconvert the signal. The oscillator modules 516 and 530 may comprise any kind of oscillator with any different electrical properties. In one example, the oscillator module 516 provides an oscillating signal to the filter module 514. The oscillator module 530 may provide an oscillating signal to the filter module 528.

The oscillator modules 516 and 530, either individually or together, may be local or remote. In one example, the oscillating module 516 and/or the oscillating module 530 may be remotely located and configured to provide an oscillating signal to one or more transmitting radio frequency units. In some embodiments, a single oscillating module may provide an oscillating signal to both the mixer module 512 and 526, respectively (e.g., optionally via a filter). In one example, the oscillator signal from the oscillator module may be altered (e.g., oscillation increased or decreased) and provided to a different part of the circuit. One or more of the oscillator modules 516 and 530 may be similar to one or more oscillator modules 210, 224, and 256 of FIG. 2.

The signal quality module 536 may be configured to generate a phase control signal to control the phase of a processed signal. In one example, the signal quality module 536 receives the upconverted RF signal from the amplifier/attenuator module 534 and mixes the amplified or attenuated signal with the filtered oscillator signal or the upconverted signal from the second upconverter (e.g., mixer module 526, filter module 528, and oscillator module 530). The signal quality module 536 may filter the signal and compare the filtered, mixed signal with a predetermined phase value to generate a phase control signal based on the comparison.

The phase adjuster 520 may comprise a variable phase control circuit configured to increase or decrease the phase of the signal to be transmitted. The phase adjuster 520 may comprise any different type of phase adjuster or phase shifter with different electrical properties. In one example, the phase adjuster 520 increases or decreases the phase of the signal received from the filter module 518. The phase adjuster 520 may adjust the phase of the signal based on the phase control signal from the signal quality module 536.

The phase adjuster 520 may include one or more components. For example, the phase adjuster 520 may comprise one or more phase control elements.

The AGC module 522 may comprise an automatic gain control (AGC) circuit configured to increase or decrease the gain of the signal received from the phase adjuster 520. The AGC module 522 may comprise many different types of AGCs with many different electrical properties. In one example, the AGC module 522 increases or decreases the gain of the signal received from the phase adjuster 520. The AGC module 522 may adjust the gain of the signal based on the gain control signal.

The AGC module 522 may include one or more components. For example, the AGC module 522 may comprise one or more AGCs.

In various embodiments, in order to adjust the phase of the signal or the amplitude of the signal, the signal quality module 536 may provide control signals to adjust the in-phase (I) and quadrature (Q) signals to achieve the a desired adjustment. For example, in order to adjust the phase or amplitude of the signal, the signal quality module 536 may utilize the digital signal DSP 504 to adjust the in-phase (I) and quadrature (Q) signals provided to the modem module 506 to achieve the desired adjustment based on the predetermined phase value and/or the predetermined amplitude value. In another example, in some embodiments, the signal quality module 536 may utilize the modem module 506 to adjust the in-phase (I) and quadrature (Q) signals provided to the predistortion module 508.

The amplification/attenuation modules 524 and 534 may comprise an amplifier and/or an attenuator configured to amplify and/or attenuate a signal. The amplification/attenuator modules 524 and 534 may be any kind of amplifiers and/or attenuators. Further, the amplification/attenuator modules 524 and 534 may each comprise amplifiers and/or attenuators with any kind of electrical properties.

In some embodiments, the amplifier/attenuator module 524 receives a signal from the AGC module 522. The amplifier/attenuator module 524 may amplify or attenuate the signal. Further, the amplifier/attenuator module 534 may attenuate the signal (or components of the signal) after the signal has been upconverted by the mixer module 526, the filter module 528, and the oscillator module 530. The amplifier/attenuator module 534 may then provide the signal to the signal quality module 536 and/or the waveguide filter 538. One or more of the amplification/attenuation modules 524 and 534 may be similar to one or more amplification/attenuation modules 204, 218, and 228 of FIG. 2.

Similar to the transmitting radio frequency unit 202, the transmitting radio frequency unit 502 may comprise the waveguide filter 538, the waveguide 540, and/or a diplexer 542. The waveguide filter 538 may be any filter coupled to the waveguide 540 and configured to filter the electromagnetic waves (e.g., remove noise). The waveguide 540 may provide the signal to the antenna 544 via a diplexer 542. The diplexer 542 may provide the signal to the antenna 544. Similar to the waveguide 246, the waveguide 540 may be any waveguide kind or type of waveguide.

In various embodiments, by utilizing open loop calibration, the total phase and amplitude for the whole transmitter path may be calibrated from I and Q input to the output of the amplifier/attenuator module 534. In some embodiments, by calibration and look-up tables, the phase and amplitude may be accurately detected, controlled, and set at the Tx output directly or through adjusting I and Q signals at the input.

Figure 6:
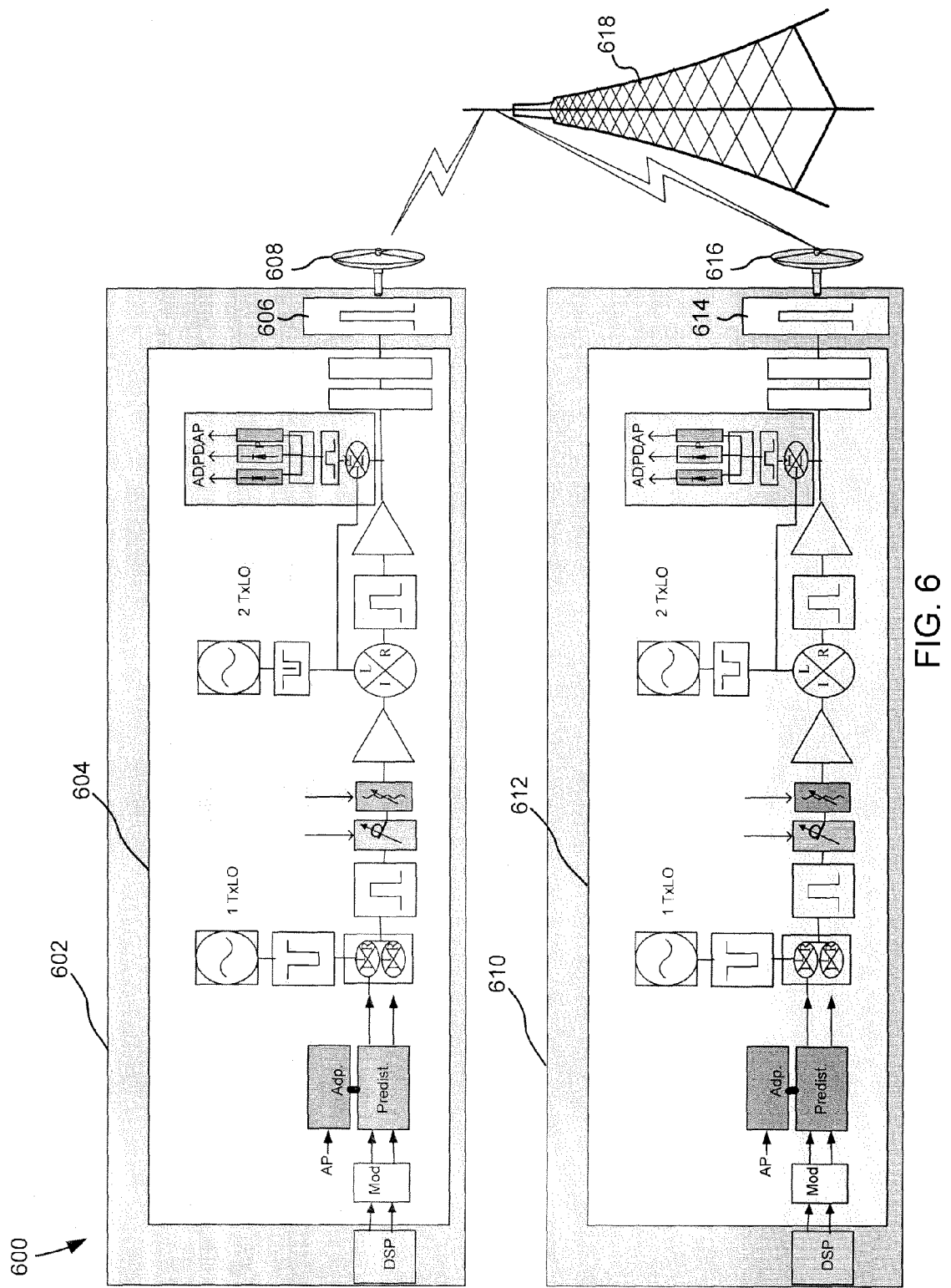
FIG. 6 depicts two transmitting radio frequency units in some embodiments.

FIG. 6 depicts two transmitting radio frequency units 604 and 612 in some embodiments. The transmitting radio frequency units 604 and 612 may each receive I and Q signals from a DSP, modulate the signals with a modem, and apply adaptive predistortion. In some embodiments, the system 600 applies digital beamforming.

The system 600 may be configured such that each of the transmitting radio frequency units 604 and 612 transmit a separate wireless signal such that the signals spatially combine. In some embodiments, radio enclosure 602 comprises the transmitting radio frequency unit 604. Similarly, the radio enclosure 610 comprises transmitting radio frequency unit 612. The transmitting radio frequency unit 604 may provide a signal to the antenna 608 via the diplexer 606 for transmission to the receiver 618. Similarly, the transmitting radio frequency unit 612 may provide a signal to the antenna 616 via the diplexer 614 for transmission to the receiver 618. The signals from both receivers may be substantially the same gain and phase. As a result, the signals may be stronger when both transmitting radio frequency units are actively transmitting.

Each wireless signal may have synchronized phase and amplitude with one or more other wireless signals from any number of transmitting radio frequency units. In some embodiments, each wireless signal may have a phase and amplitude that is synchronized with predetermined values (e.g., set by a user, or set according to the phase and amplitude output of a designated transmitting radio frequency unit 604 or 612).

Those of skill in the art will appreciate that the transmitting radio frequency units 604 and 612 may comprise components that are similar to those described with respect to the transmitting radio frequency unit 202 (see FIG. 2). The antennas 608 and 616 may comprise any kind of antennas. Further, although only two transmitting radio frequency units 604 and 612 are depicted, there may be any number of transmitting radio frequency units.

Figure 7:
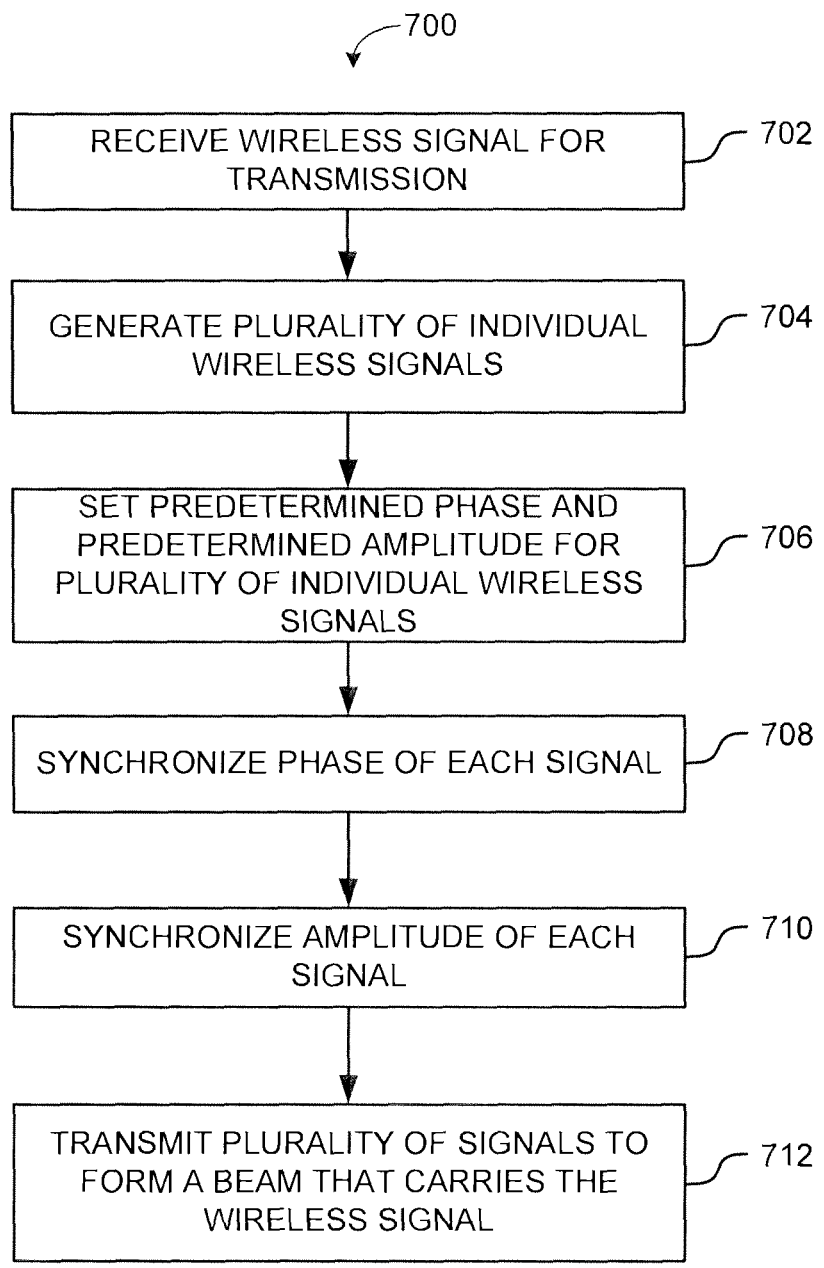
FIG. 7 is a flowchart of an exemplary method for transmitting a wireless signal in accordance with some embodiments.

FIG. 7 is a flowchart of an exemplary method 700 for transmitting a wireless signal in accordance with some embodiments. In step 702, an input signal intended for transmission may be received by a transmitting radio frequency unit. In some embodiments, the transmitting radio frequency unit may receive the input signal via a modem and/or a DSP.

In step 704, the transmitting radio frequency unit may generate an individual wireless signal from the input signal received at step 702. As noted herein, in some embodiments, a plurality of individual wireless signals generated by multiple transmitting radio frequency units may be eventually transmitted such that the individual wireless signals spatially combine to form a beam that carries the input signal (received at step 702) from a transmitting communications site to a receiving communications site. Depending on the embodiment, each of transmitting radio frequency units may generate their respective signal using the transmission path similar to the transmitting radio frequency unit 202 as illustrated in FIG. 2 and/or transmitting radio frequency unit 502 as illustrated in FIG. 5.

In step 706, the transmitting radio frequency units may set a predetermined phase value and predetermined gain value. The predetermined phase value and the predetermined gain value may be set at any time. In some embodiments, the predetermined phase value and predetermined gain value are set based on the beam intended to be formed by the spatial combination of the individual wireless signals as they are outputted by the transmitting radio frequency units. Subsequently, if one of the transmitting radio frequency units experiences a failure and/or falls below an acceptable level of performance, in some embodiments, the other transmitting radio frequency units may continue to transmit the signal at the predetermined phase and gain. Additionally, in such a scenario, the predetermined phase value and the predetermined gain value may be adjusted to account for the beam being formed by two of the transmitting radio frequency units rather than all three.

Additionally, in some embodiments, the predetermined phase value and predetermined gain value may be the same for each transmitting radio frequency unit and are shared amongst the transmitting radio frequency units. In doing so, the transmitting radio frequency units of some embodiments may facilitate synchronization of phase and amplitude between the transmitting radio frequency units.

In step 708, each of the transmitting radio frequency units may synchronize the phase of the individual wireless signal they are outputting with the phase of the individual wireless signals being outputted by the other radio frequency units. As noted herein, in some embodiments, each of the transmitting radio frequency units may synchronize the phase of their respective individual wireless signal by sharing the predetermined phase value, and/or using the predetermined phase value to adjust their individual signal's phase. For example, as noted herein, the predetermined phase value may be set by a user, may be based on the phase of a wireless signal being outputted by one or more designated transmitting radio frequency unit in the system, or may be based on a calibration process involving one or more transmitting radio frequency unit in the system.

In step 710, each of the transmitting radio frequency units may synchronize the amplitude of the individual wireless signal they are outputting with the amplitude of the individual wireless signals being outputted by the other radio frequency units. As noted herein, in some embodiments, each of the transmitting radio frequency units may synchronize the amplitude of their respective individual wireless signal by sharing the predetermined gain value, and/or using the predetermined gain value to adjust the individual signal's amplitude. For example, as noted herein, the predetermined gain value may be set by a user, may be based on the amplitude of a wireless signal being outputted by one or more designated transmitting radio frequency unit in the system, or may be based on a calibration process involving one or more transmitting radio frequency unit in the system.

In step 712, each of the transmitting radio frequency units may transmit their individual wireless signal to one or more receiving radio frequency units. In some embodiments, each of the transmitting radio frequency units may transmit their respective individual wireless signal such that the individual wireless signals spatially combine to form a beam that carries the input signal to the one or more receiving radio frequency units.

It should be understood that those of ordinary skill in the art would appreciate that one or more steps of method 700 as illustrated in FIG. 7 could be performed in the context of other systems or components. Further, it should be noted that the steps may be performed in any order.

Various embodiments are described herein as examples. It will be apparent to those skilled in the art that various modifications may be made and other embodiments can be used without departing from the broader scope of the present invention. Therefore, these and other variations upon the exemplary embodiments are intended to be covered by the present invention.

What is claimed is:

1. A system comprising:
  a first transmitting radio frequency unit including:
    a first reference signal module configured to provide a first reference signal having reference signal properties shared with a second reference signal in a second transmitting radio frequency unit; and
    a first signal quality module coupled to the first reference signal module, the first signal quality module configured to synchronize input signal properties of an input signal with the reference signal properties of the first reference signal to produce a first synchronized signal; and
  a first antenna coupled to the first signal quality module, the first antenna configured to provide a first wireless signal corresponding to the first synchronized signal, the first wireless signal being spatially combined with a second wireless signal from the second transmitting radio frequency unit to form a beam comprising the first wireless signal and the second wireless signal.

2. The system of claim 1, wherein the reference signal properties of the first reference signal comprise one or more of a gain and a phase of the reference signal.

3. The system of claim 1, wherein the input signal properties of the input signal comprise one or more of a gain and a phase of the input signal.

4. The system of claim 1, wherein the first reference signal module comprises a comparator configured to set the reference signal properties using a pilot signal provided to the first transmitting radio frequency unit and to the second transmitting radio frequency unit.

5. The system of claim 1, wherein the first reference signal module comprises a comparator configured to set the reference signal properties based on a value stored on a chip in the first transmitting radio frequency unit.

6. The system of claim 1, wherein the first transmitting radio frequency unit and the second transmitting radio frequency unit are part of a 1+1 transmitter protection system.

7. The system of claim 1, wherein the first transmitting radio frequency unit and the second transmitting radio frequency unit are part of a 1+N transmitter protection system.

8. The system of claim 1, wherein the second transmitting radio frequency unit comprises:
  a second reference signal module configured to provide the second reference signal;
  a second signal quality module coupled to the second reference signal module, the second signal quality module configured to synchronize input signal properties of the input signal with the reference signal properties of the second reference signal to produce a second synchronized signal; and
  a second antenna coupled to the second signal quality module, the second antenna configured to provide the second wireless signal.

9. The system of claim 1, wherein the first antenna is part of an antenna array.

10. The system of claim 9, wherein the antenna array comprises a phased antenna array.

11. The system of claim 9, wherein the antenna array comprises one or more of a linear antenna array and a planar antenna array.

12. A method comprising:
  providing a first reference signal having reference signal properties shared with a second reference signal in a second transmitting radio frequency unit;
  synchronizing input signal properties of an input signal with the reference signal properties of the first reference signal to produce a first synchronized signal; and
  providing a first wireless signal corresponding to the first synchronized signal, the first wireless signal being spatially combined with a second wireless signal from the second transmitting radio frequency unit to form a beam comprising the first wireless signal and the second wireless signal.

13. The method of claim 12, wherein the reference signal properties of the first reference signal comprise one or more of a gain and a phase of the reference signal.

14. The method of claim 12, wherein the input signal properties of the input signal comprise one or more of a gain and a phase of the input signal.

15. The method of claim 12, further comprising setting the reference signal properties using a pilot signal provided to a first transmitting radio frequency unit and to the second transmitting radio frequency unit.

16. The method of claim 12, wherein a first transmitting radio frequency unit and the second transmitting radio frequency unit are part of a 1+1 transmitter protection system.

17. The method of claim 12, wherein a first transmitting radio frequency unit and the second transmitting radio frequency unit are part of a 1+N transmitter protection system.

18. The method of claim 12, further comprising:
  providing the second reference signal;
  synchronizing the input signal properties of the input signal with the reference signal properties of the second reference signal to produce a second synchronized signal; and
  providing the second wireless signal with an antenna.

19. The method of claim 18, wherein the antenna is part of an antenna array.

20. A system comprising:
  means for providing a first reference signal having reference signal properties shared with a second reference signal in a second transmitting radio frequency unit;
  means for synchronizing input signal properties of an input signal with the reference signal properties of the first reference signal to produce a first synchronized signal; and
  means for providing a first wireless signal corresponding to the first synchronized signal, the first wireless signal being spatially combined with a second wireless signal from the second transmitting radio frequency unit to form a beam comprising the first wireless signal and the second wireless signal.

* * * * *